US010259138B2

(12) United States Patent
Smith et al.

(10) Patent No.: US 10,259,138 B2
(45) Date of Patent: Apr. 16, 2019

(54) INJECTION MOLD SYSTEM FOR COMPONENT CORE

(71) Applicant: General Electric Company, Schenectady, NY (US)

(72) Inventors: Dillon Mathew Smith, Walhalla, SC (US); Travis J Packer, Simpsonville, SC (US); James Stuart Pratt, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 247 days.

(21) Appl. No.: 15/417,384

(22) Filed: Jan. 27, 2017

(65) Prior Publication Data

US 2018/0215070 A1 Aug. 2, 2018

(51) Int. Cl.
*B28B 7/00* (2006.01)
*B28B 1/24* (2006.01)
*B05C 7/04* (2006.01)
*B33Y 80/00* (2015.01)
*B22F 3/00* (2006.01)

(52) U.S. Cl.
CPC ............... *B28B 1/24* (2013.01); *B22F 3/008* (2013.01); *B33Y 80/00* (2014.12)

(58) Field of Classification Search
CPC .................................... B28B 1/24; B05C 7/04

USPC ......................................................... 264/267
See application file for complete search history.

(56) References Cited

U.S. PATENT DOCUMENTS

| 3,431,332 A | 3/1969 | Cummings | |
| 6,454,536 B1* | 9/2002 | Evans | B29C 39/10 416/224 |
| 8,225,506 B2* | 7/2012 | Chivers | F01D 5/147 264/261 |
| 2003/0015308 A1 | 1/2003 | Fosaaen et al. | |

FOREIGN PATENT DOCUMENTS

| EP | 1001861 B1 | 5/2000 |
| JP | 2004174861 A | 6/2004 |

* cited by examiner

*Primary Examiner* — Robert B Davis
(74) *Attorney, Agent, or Firm* — Ernest G. Cusick; Hoffman Warnick LLC

(57) ABSTRACT

An injection mold system for injecting slurry into an internal portion of an injection mold component core is disclosed. The system may include a fill clip for injecting slurry into an internal portion of an injection mold component core including a fill member for injecting slurry into the internal portion of the injection mold component core, and a latch member for removably coupling the fill member with the injection mold component core. The system may also include a fill reservoir for collecting excess slurry from the internal portion of the injection mold component core. The fill reservoir may also redistribute the excess slurry back into the internal portion of the injection mold component core.

20 Claims, 8 Drawing Sheets

US 10,259,138 B2

INJECTION MOLD SYSTEM FOR COMPONENT CORE

FIELD

The subject matter disclosed herein relates to injection molding. More particularly, the subject matter relates to injecting slurry into an internal portion of an injection mold component core.

BACKGROUND

Slurry-based injection molding can be used to form solid objects, e.g., solid ceramic objects, from a fluid slurry. Slurry-based injection molding methods are useful for manufacturing complex or delicate objects with a higher density than powder-based additive manufacturing methods. For example, slurry-based injection molding is useful for forming ceramic component cores of turbine components such as turbine blades, nozzles, and the like.

During formation of ceramic component cores, internal portions of the ceramic component core may be left hollow in order to assist in making more intricate passages within the component core. Conventionally, once the component core has been cured and fired, internal portions are individually filled, and the component is fired a second time. During filling of these hollow internal portions, e.g., hollow internal portions, excess slurry may exit the component core at an opposite opening of the hollow internal portions. However, these multi-step conventional approaches can be time-consuming, costly, and result in poor fill quality.

BRIEF DESCRIPTION

A first aspect of the disclosure includes a fill clip for injecting slurry into an internal portion of an injection mold component core, the fill clip including: a fill member sized to engage a first side of the injection mold component core, the fill member having at least one slurry input for receiving the slurry and a plurality of slurry outputs positioned to output the slurry into the internal portion of the injection mold component core, and a latch member coupled with the fill member, the latch member configured to removably couple the fill member with the injection mold component core.

A second aspect of the disclosure includes an injection mold system for injecting slurry into a component core, the core having a first end, a second end and an internal portion between the first end and the second end, the injection mold system including: a fill clip for injecting slurry into the internal portion of the component core, the fill clip including a fill member sized to engage a first side of the injection mold component core, the fill member having at least one slurry input for receiving the slurry and a plurality of slurry outputs positioned to output the slurry into the internal portion of the component core and a latch member coupled with the fill member, the latch member configured to removably couple the fill member with the component core; and a fill reservoir configured to couple with at least one of the first end or second end of the component core, the fill reservoir for collecting and redistributing excess slurry into the internal portion of the component core during an injection mold process, the fill reservoir configured to engage a top surface of the component core, the fill reservoir including a cavity for collecting the excess slurry, and at least one slurry output positioned to output the excess slurry back into the internal portion of the component core.

A third aspect of the disclosure includes a non-transitory computer readable storage medium storing code representative of a fill clip for injecting slurry into an internal portion of a component core, the fill clip physically generated upon execution of the code by a computerized additive manufacturing system, the code including: code representing the fill clip, the fill clip including a fill member sized to engage a first side of the injection mold component core, the fill member having at least one slurry input for receiving the slurry and a plurality of slurry outputs positioned to output the slurry into the internal portion of the injection mold component core, and a latch member coupled with the fill member, the latch member configured to removably couple the fill member with the injection mold component core.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure.

DETAILED DESCRIPTION

Figure 1:
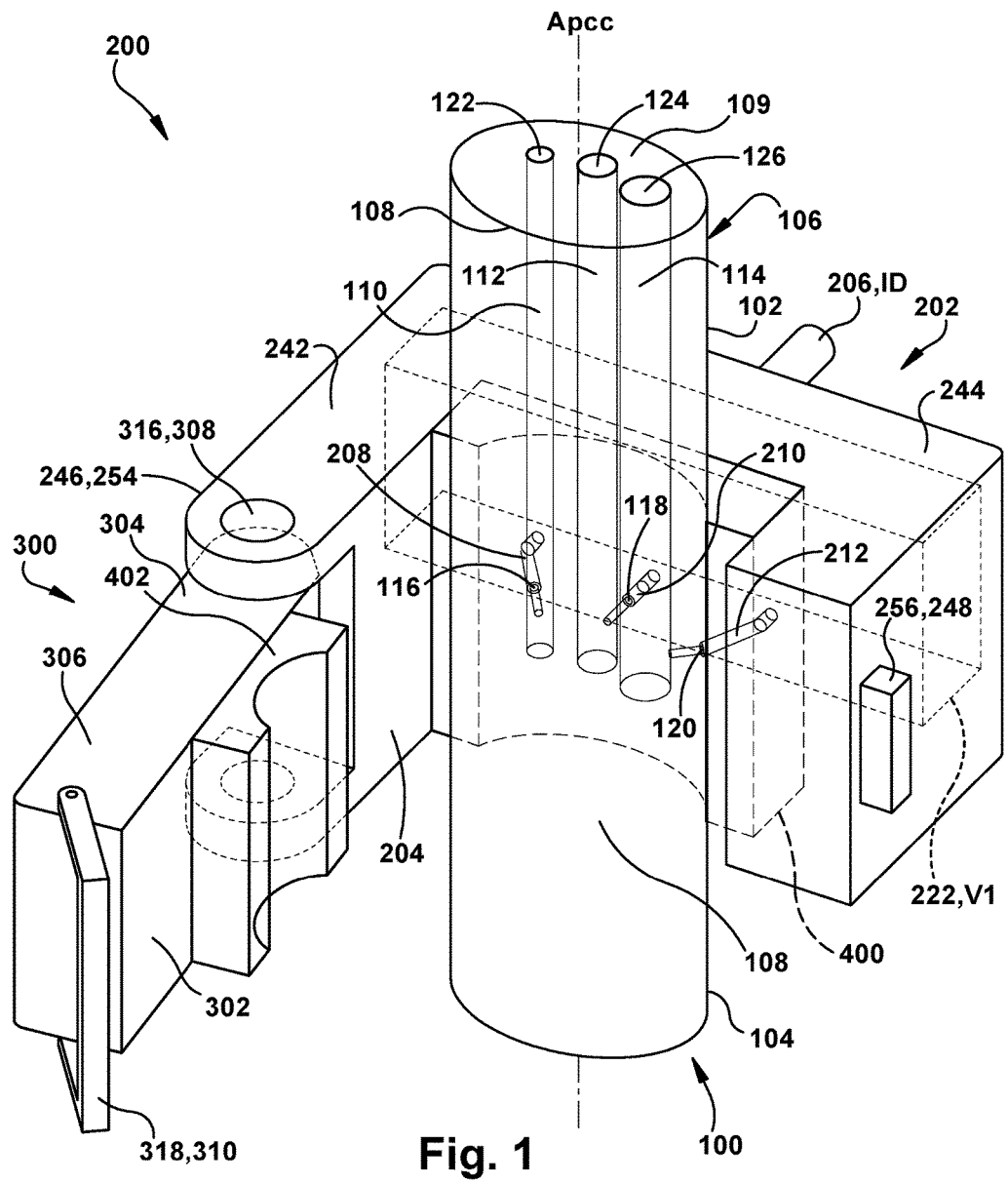
FIG. 1 shows a perspective view of an example of a fill clip for an illustrative component, the fill clip including a fill member, latch member, and moldable members, according to various embodiments of the disclosure.
Figure 2:
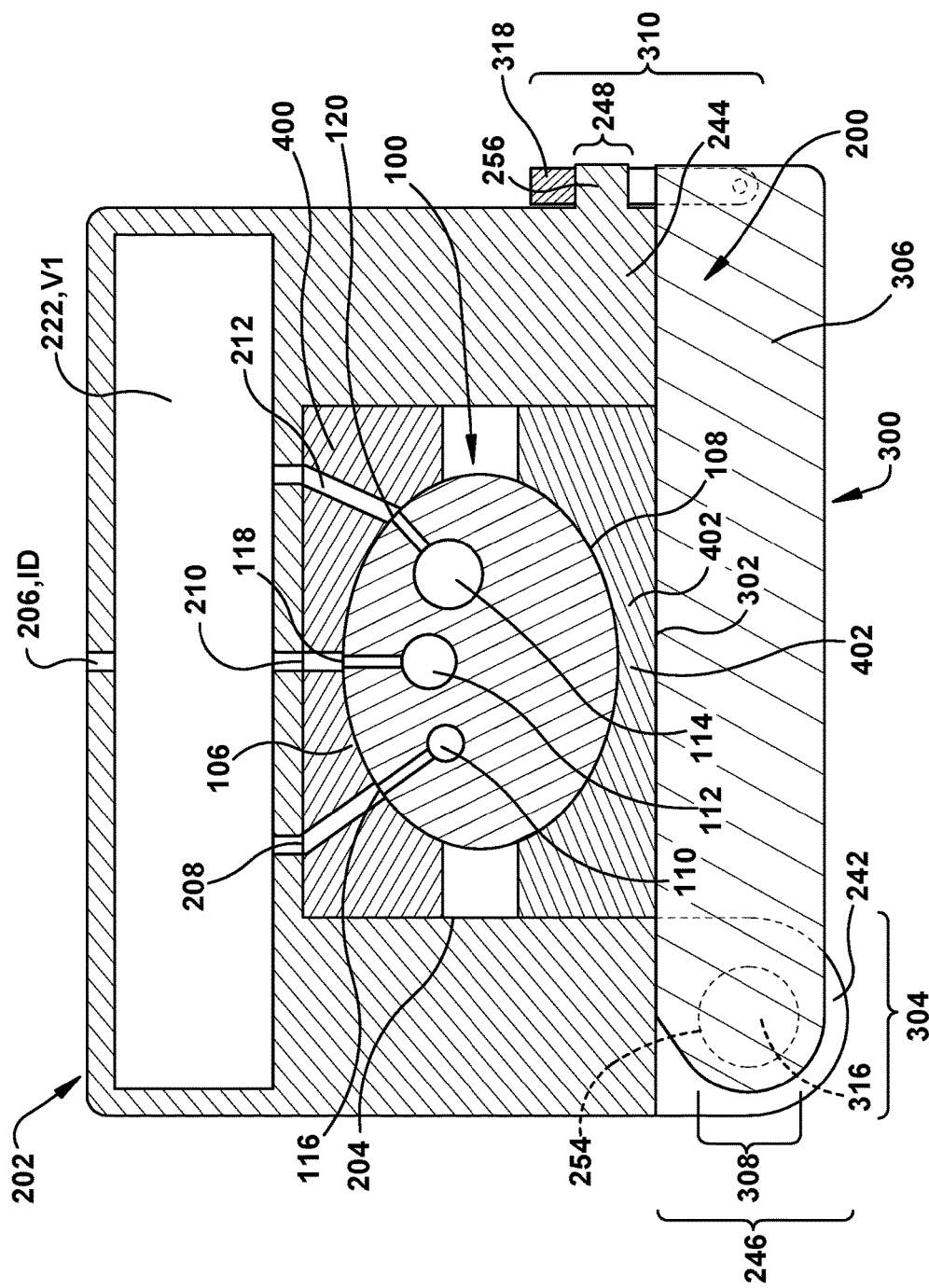
FIG. 2 shows a cross section view of the example fill clip of FIG. 1 removably coupled to the illustrative component, according to various embodiments of the disclosure.
Figure 3:
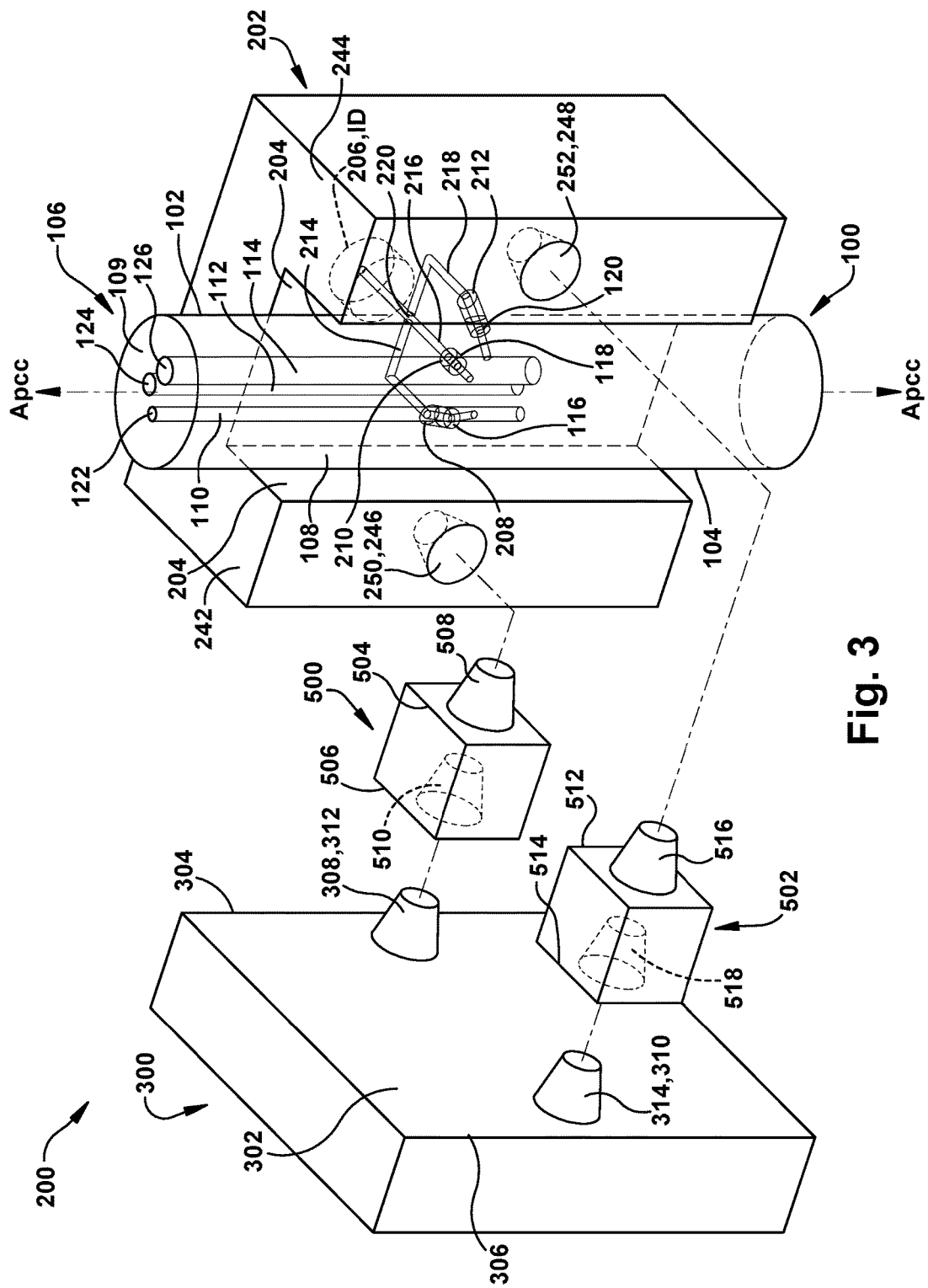
FIG. 3 shows a perspective view of another example of a fill clip for an illustrative component, the fill clip including a fill member, latch member, and coupling members, according to various embodiments of the disclosure.
Figure 4:
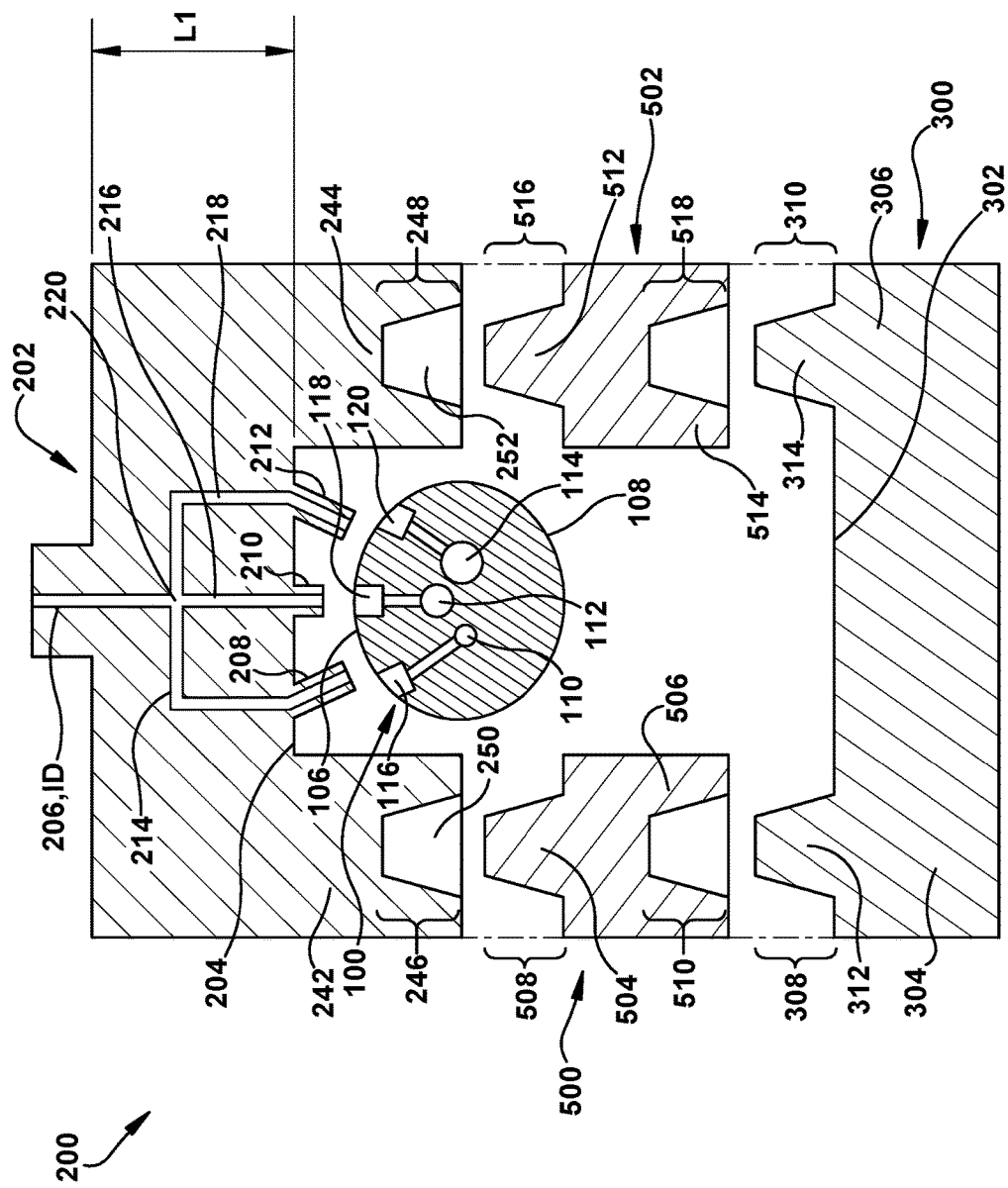
FIG. 4 shows a cross section view of the example fill clip and illustrative component of FIG. 3, according to various embodiments of the disclosure.
Figure 5:
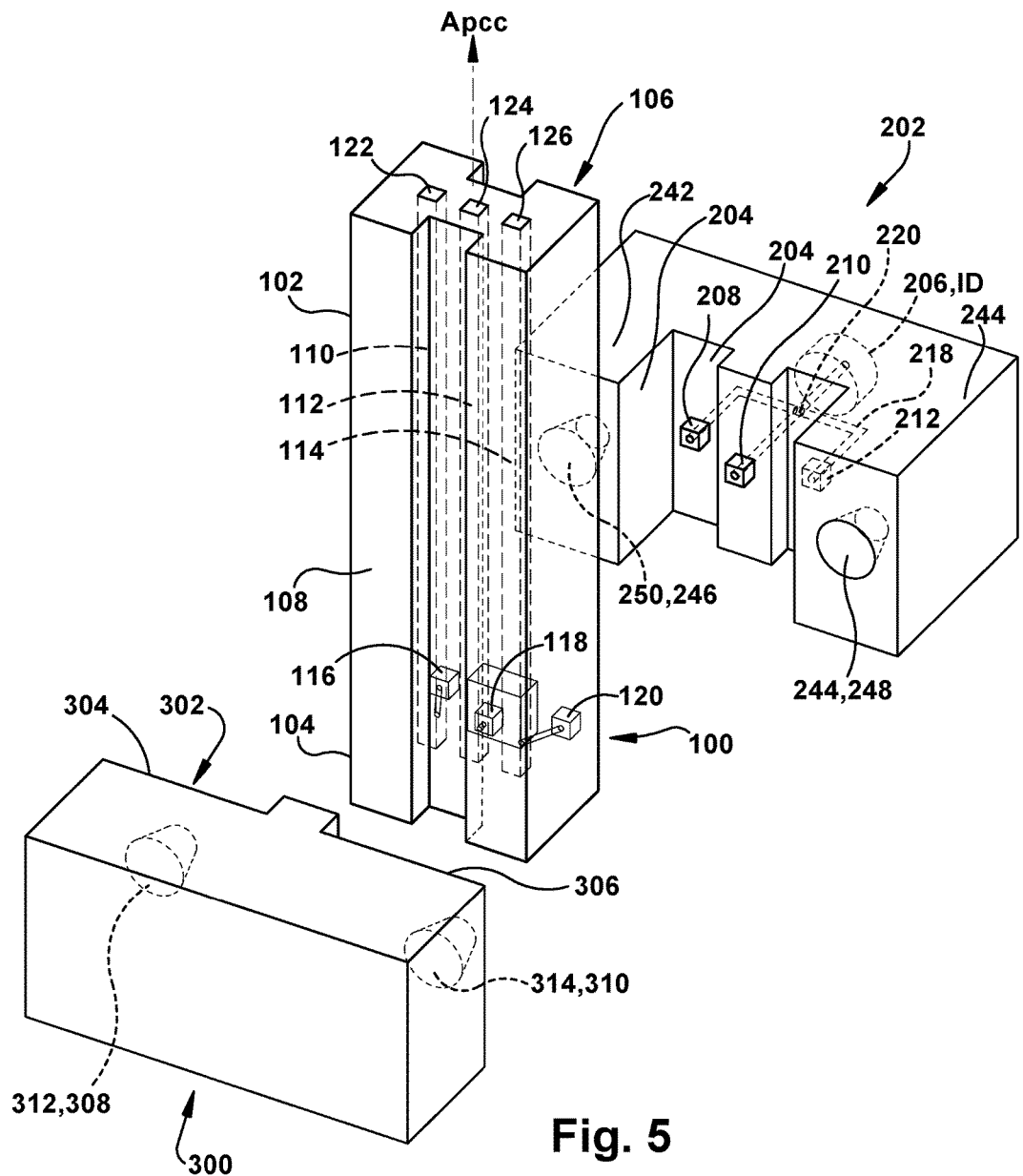
FIG. 5 shows a perspective view of another example of a fill clip for an illustrative component, the fill clip including a fill member and latch member, according to various embodiments of the disclosure.

FIGS. 1-6 (see also, FIG. 7 to be discussed herein) show non-limiting examples of an illustrative component core 100. Component core 100 may include any component pre-formed by injection molding. As shown in FIGS. 1, 3 and 5, component core 100 may include a first end 102 and second end 104, opposing first end 102. As best shown in FIGS. 1, 3 and 5, component core 100 may include a first side 106 spanning between first end 102 and second end 104, along primary axis $A_{pcc}$ of component core 100. As best shown in FIGS. 1, 3 and 5, component core 100 may also include a second side 108, opposing first side 106, spanning between first end 102 and second end 104 along primary axis $A_{pcc}$. As shown in FIGS. 1, 3 and 5, component core may include a top side 109 at first end 102. Component core 100 may also include internal portions 110, 112, 114. Internal portions 110, 112, 114 may include hollow structures, e.g. channels, within component core 100. For example, as shown in FIGS. 1-4, internal portions 110, 112, 114 may include substantially circular channels. In another example, shown in FIGS. 5-6, internal portions 110, 112, 114 may include substantially square channels. It is understood that internal portions 110, 112, 114 may include any shape desirable for component core 100. As best shown in FIGS. 1, 3 and 5, internal portions 110, 112, 114 may extend through component core 100 between first side 106 and second side 108, from first end 102 and second end 104. For example, as show in FIG. 5, internal portions 110, 112, 114 may extend substantially entirely throughout component core 100 from first end 102 to second end 104. Although three internal portions 110, 112, 114 are depicted in FIGS. 1-6, it is understood that this number is merely illustrative, and component core 100 may include more or less internal portions.

As shown in the non-limiting examples of FIGS. 1-6, component core 100 may include slurry receipt openings 116, 118, 120 for receiving slurry from fill member 202, to be discussed herein, and/or a slurry source (not shown). Slurry receipt openings 116, 118, 120 may be in fluid communication with internal portions 110, 112, 114, respectively. As shown in FIGS. 1-6 slurry receipt openings 116, 118, 120 may be positioned on first side 106 (see, FIGS. 1, 3 and 5) of component core 100 towards second end 104 (see, FIGS. 1, 3 and 5). It is understood that slurry receipt openings 116, 118, 120 may be located on component core 100 at any desirable location for injecting slurry into internal portions 110, 112, 114. Although depicted in the examples of FIGS. 1-6 as substantially circular female openings in first side 106 of component core 100, it is understood that slurry receipt openings 116, 118, 120 may include any desirable structure for receiving slurry from a slurry source (not shown) and/or fill clip 200. As shown best in the example of FIG. 5, slurry receipt openings 116, 118, 120 may include substantially square female openings.

Although FIGS. 1-6 depict three slurry receipt openings 116, 118, 120, it is understood that this number is merely illustrative, and component core 100 may include more or less slurry receipt openings. Additionally, as shown in FIGS. 1-6, the number of slurry receipt openings 116, 118, 120 may be dependent on the number internal portions 110, 112, 114.

Figure 7:
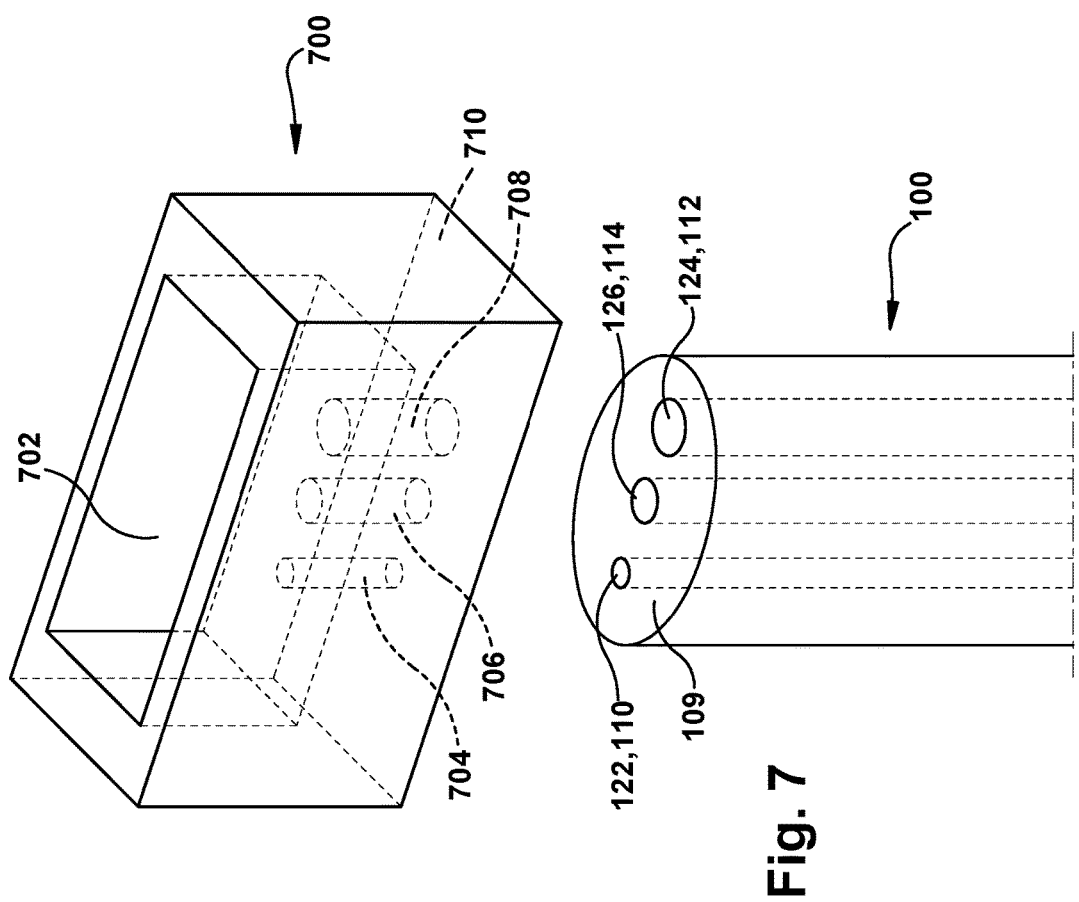
FIG. 7 shows a perspective view of an example of a fill reservoir, according to various embodiments of the disclosure.

As shown in FIGS. 1, 3 and 5, component core 100 may include slurry overflow openings 122, 124, 126 for releasing excess slurry from internal portions 110, 112, 114 of component core 100 during filling of internal portions 110, 112, 114 (see also, FIG. 7 to be discussed herein). Slurry overflow openings 122, 124, 126 may be in fluid communication with internal portions 110, 112, 114, respectively. FIGS. 1, 3 and 5 show slurry overflow openings 122, 124, 126 positioned on top side 109 at first end 102 of component core 100. It is understood that slurry overflow openings 122, 124, 126 may be positioned on component core 100 at any desirable location for releasing excess slurry from internal portions 110, 112, 114. As shown in FIG. 7, as will be discussed herein, slurry overflow openings 122, 124, 126 may be positioned to output slurry into fill reservoir 700. As shown in the examples of FIGS. 1 and 3, slurry overflow openings 122, 124, 126 may be substantially circular female openings on top side 109 of component core 100. Alternatively, as shown in the example of FIG. 5, slurry overflow openings 122, 124, 126 may include square female openings. It is understood that slurry overflow openings 122, 124, 126 may include any desirable structure for releasing excess slurry from internal portions 110, 112, 114 and/or releasing slurry into fill reservoir 700 (see, FIG. 7), as will be discussed herein.

Although three slurry overflow openings 122, 124, 126 are depicted in FIGS. 1, 3 and 5, it is understood that this number is merely illustrative, and component core 100 may include more or less slurry receipt openings. As shown in FIGS. 1, 3 and 5, the number of slurry overflow openings 122, 124, 126 may be dependent on the number internal portions 110, 112, 114.

Component core 100 may be formed, for example, from any material that may be processed by injection molding. For example, component core 100 may be formed from ceramic slurry, and/or any other material having substantially similar physical properties.

FIGS. 1-6 show non-limiting examples of fill clip 200 for injecting slurry into internal portions 110, 112, 114 of component core 100. As shown in FIGS. 1, 3 and 5, fill clip 200 may be configured to surround component core 100, around primary axis $A_{pcc}$. Although the examples described herein include fill clip 200 configured to engage and inject slurry into component core 100, it is understood that fill clip 200 may be configured to surround and inject slurry into any desirable injection mold component core.

As shown in FIGS. 1-6, fill clip 200 may include fill member 202 for engaging and injecting slurry into component core 100. Fill member 202 may be sized to engage first side 106 of component core 100. Fill member 202 may include any size and/or shape desirable for removably engaging fill clip 200 to first side 106 of component core 100. As shown in the examples of FIGS. 1-6, fill member 202 may have a substantially two-dimensional U-shape. As shown in FIGS. 1-6, fill member 202 may include a substantially different shape (e.g. three-dimensional u-shape) from the shape of first side 106 (e.g. archaic) of component core 100. Alternatively, fill member 202 may include a substantially similar shape as first side 106 of component core 100. As shown in FIGS. 3-4, fill member 202 may surround approximately 180° of primary axis $A_{pcc}$ of component core 100. Alternative, as shown in FIGS. 1-4, fill member 202 may surround more than 180° of primary axis $A_{pcc}$ (see, FIGS. 1 and 3) of component core 100. In another example, not shown, fill member 202 may surround less than 180° of primary axis $A_{pcc}$ (see, FIGS. 1, and 3).

Figure 6:
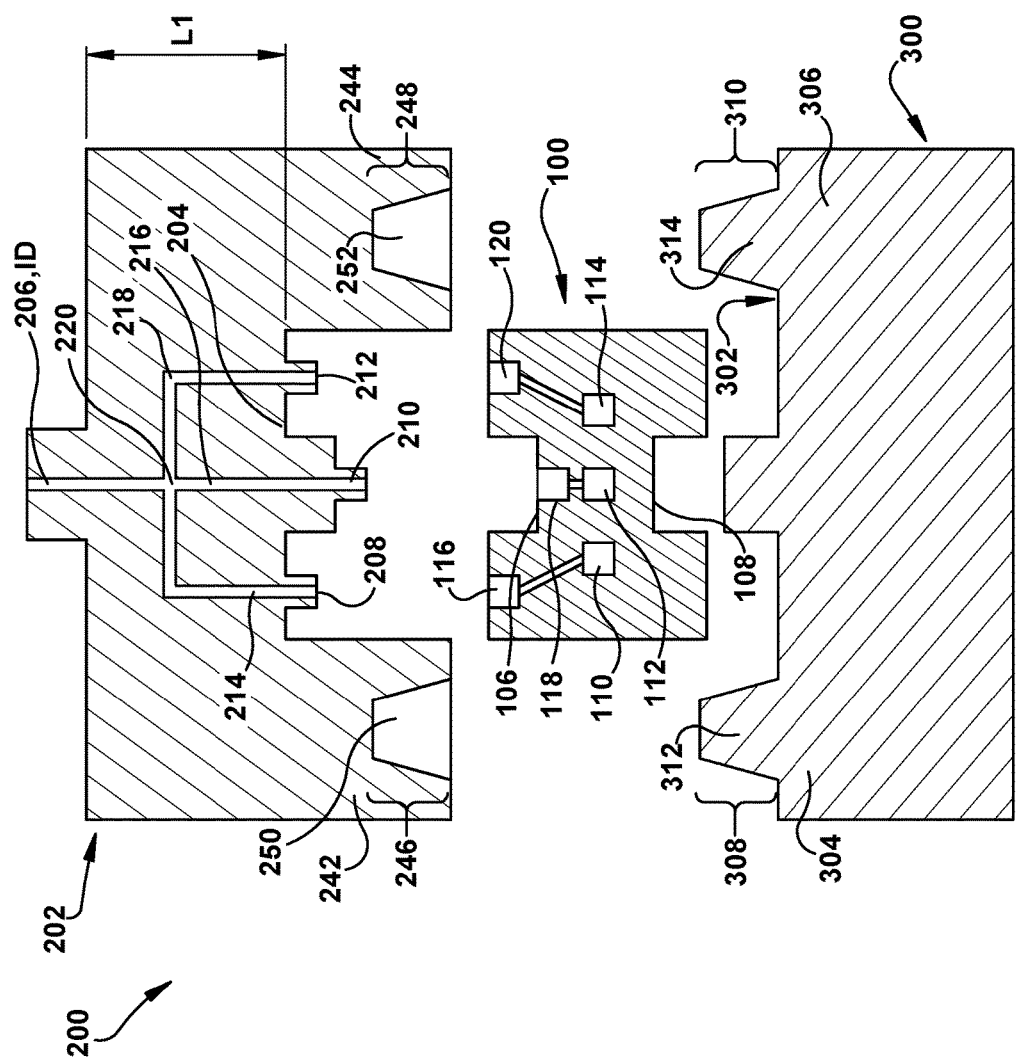
FIG. 6 shows a cross section view of the example fill clip and illustrative component of FIG. 5, according to various embodiments of the disclosure.

As shown in FIGS. 1-6, fill member 202 may include an inner surface 204. As shown in FIGS. 3-6, inner surface 204 may be configured to removably engage first side 106 of component core 100. Inner surface 204 may include any shape desirable for removably engaging first side 106 of component 100. As shown in the example of FIGS. 5-6, the shape of inner surface 204 may correspond to the shape of first side 106 of component core 100. Alternatively, as shown in the examples of FIGS. 1-4, the shape of inner surface 204 may be different from the shape of first side 106 of component core 100.

As shown in FIGS. 1-6, fill member 202 may also include slurry input 206 for receiving the slurry from a slurry source (not shown). Slurry input 206 may include an inner diameter ID. FIGS. 1-6 depict slurry input 206 as positioned opposite inner surface 204 of fill member 202. It is understood that slurry input 206 may be located at any position of fill member 202 desirable for receiving slurry from a slurry source (not shown). Slurry input 206 may include any desirable structure for engaging a slurry source (not shown). For example, as best shown in FIG. 1, slurry input 206 may include a substantially circular female opening in fill member 202. For example, as shown in FIGS. 3 and 5, slurry input 206 may include a substantially circular male component. Although one slurry input 206 is depicted in FIGS. 1-6, it is understood that this number is merely illustrative, and fill member 202 may include more slurry inputs 206.

As shown in FIGS. 1-6, fill member 202 may also include slurry outputs 208, 210, 212 for injecting slurry into internal portions 110, 112, 114 of component core 100. As shown in FIGS. 1-6, slurry outputs 208, 210, 212 may include approximately the same inner diameter as each other and/or inner diameter ID of slurry input 206. Slurry outputs 208, 210, 212 may be located in any desirable location on fill member 202 for injecting slurry into component core 100. For example, as shown FIGS. 1-6, slurry outputs 208, 210, 212 may be positioned on inner surface 204 and opposite slurry input 206. Slurry outputs 208, 210, 212 may include any desirable structure for injecting slurry into internal portions 110, 112, 114 of component core 100. For example, as shown best in FIGS. 1 and 3, slurry outputs 208, 210, 212 may include substantially circular male components configured to engage substantially circular female slurry receipt openings 116, 118, 120 of component core 100. As shown best in the example of FIG. 5, slurry outputs 208, 210, 212 may include substantially square male components. Although FIGS. 1-6, depict three slurry outputs 208, 210, 212, it is understood that this number is merely illustrative, and fill member 202 may include more or less slurry outputs. As shown in the examples of FIGS. 1-6, the number of slurry outputs 208, 210, 212 may be dependent on the number of slurry receipt openings 116, 118, 120 in component core 100.

As shown in the non-limiting examples of FIGS. 3-6, fill member 202 may include fluid passages 214, 216, 218 for delivering slurry from slurry input 206 to slurry outputs 208, 210, 212, respectively. As best shown in FIGS. 3-6, fluid passages 214, 216, 218 may span within fill member 202 between slurry input 204 and slurry outputs 208, 210, 212. As shown in the examples of FIGS. 3-6, fluid passages 214, 216, 218 may be isolated from one another. Fluid passages 214, 216, 218 may include any shape and/or path and/or size desirable for delivering slurry from slurry input 206 to slurry outputs 208, 210, 212. For example, specific passage lengths, such as passage length L1, shown in FIGS. 3 and 5, may be selected, for example, to control the flow rate of slurry within fill member 202. As show best in FIGS. 3 and 5 fluid passages 214, 216, 218 may include a substantially circular cross-section. As shown in FIGS. 3-6, fluid passages 214, 216, 218 may include substantially equal inner diameters throughout the passages. Although FIGS. 3-6, depict three fluid passages 214, 216, 218, it is understood that this number is merely illustrative, and fill member 202 may include more or less fluid passages. As shown in FIGS. 3-6, the number of fluid passages 214, 216, 218 may be dependent on the number of slurry outputs 208, 210, 212. As shown in FIGS. 3-6, fluid passages 214, 216, 218 may include a junction 220 within fill member 202 between slurry input 206 and/or slurry outputs 208, 210, 212. Junction 220 may be located at any position within fill member 206 desirable for connecting fluid passages 214, 216, 218. As shown in FIGS. 3-6, junction 220 may be positioned at approximately the middle of the length of fluid passage 216.

Alternatively, as shown in the non-limiting examples of FIGS. 1-2, fill member 202 may include cavity 222 for storing slurry within fill member 202 and/or delivering slurry from slurry input 206 to slurry outputs 208, 210, 212. Cavity 222 may include any shape and/or size desirable for storing slurry within fill member 202 and/or delivering slurry from slurry input 206 to slurry outputs 208, 210, 212. As show FIGS. 1-2, cavity 222 may include a substantially cuboid area. Cavity 222 may include volume V1 for storing slurry. As shown in FIGS. 1-2, volume V1 may be substantially greater than the combined volumes of fluid passages 214, 216, 218 including, for example, approximately length L1 (see, FIGS. 3 and 5) and inner diameter ID. Although FIGS. 1-2, depict one cavity 222, it is understood that this number is merely illustrative, and fill member 202 may include any desirable number of cavities. For example, fill member 202 may include multiple cavities 222, for example a first individual cavity (not shown) for connecting slurry input 206 to slurry output 208 and/or a second individual cavity (not shown) for connecting slurry input 206 to slurry output 210 and/or a third individual cavity (not shown) for connecting slurry input 206 to slurry output 212.

As shown in non-limiting examples of FIGS. 1-6, fill member 202 may include a first end 242 and a second end 244. First end 242 may include first coupling mechanism 246 for removably coupling fill member 202 to latch member 300, as will be described herein. Second end 244 may include second coupling mechanism 248 for removably coupling fill member 202 to latch member 300, as will be described herein. First coupling mechanism 246 and second coupling mechanism 248 may include for example, a metal clipping mechanism, composite clips, male-female mating, and any other coupling mechanism sufficient to removably couple fill member 202 to latch member 300. In another example, first coupling mechanism 246 and/or second coupling mechanism 248 may include a coupling mechanism for permanently coupling one end of fill member 202 to a corresponding end of latch member 300.

As shown in FIGS. 1-2, first coupling mechanism 246 may alternatively include shaft receipt opening 254 of a hinge joint through first end 242, and second coupling mechanism 248 may alternatively include bar 256 of a bar guard joint, for coupling fill member 202 with latch member 300, as will be described herein. As shown in FIGS. 3-6, first coupling mechanism 246 and second coupling mechanism 248 may include, for example, pin sockets 250, 252 of a dovetail joint, configured to couple with latch member 300, as will be described herein. As shown FIGS. 3-6, the ends of the fill member 202 and latch member 300 may be coupled by the same coupling mechanism. Alternatively, as shown in the FIGS. 1-2, the first ends of fill member 202 and latch member 300 may be coupled by a different coupling mechanism than the second ends of fill member 202 and latch member 300. Although FIGS. 1-6, depict one of each first coupling mechanism 246 and second coupling mechanism 248, it is understood that this number is merely illustrative, and fill member 202 may include additional coupling mechanisms.

Fill member 202 may be formed, for example, from any material that may be machined and/or processed to form fill member 202. For example, fill member 202 may be formed from acrylonitrile butadiene styreneplastic (ABS), wax pour, and any other material having substantially similar physical properties.

As shown in FIGS. 1-6, fill clip 200 may also include latch member 300. Latch member 300 may be configured to couple with fill member 202 to removably engage fill member 202 with component core 100. Latch member 300 may be sized to removably engage second side 108 of component core 100. Latch member 300 may include any shape and/or size desirable to engage second side 108 of component core 100. As shown in FIGS. 1-6, latch member 300 may include a cuboid shape. As shown in FIGS. 1-6, latch member 300 may include a substantially different shape (e.g. cuboid) from the shape of second side 108 (e.g. archaic) of component core 100. As shown in the examples of FIGS. 1-6, latch member 300 may surround approximately 45° of primary axis $A_{pcc}$ (see, FIGS. 1, 3 and 5) of component core 100. Alternatively, latch member 300 may surround more or less than 45° of primary axis $A_{pcc}$ of component core 100. As shown in FIGS. 1-6, latch member 300 may include an inner surface 302. As shown in FIGS. 3-6, inner surface 302 may be configured to removably engage second side 108 of component core 100. Inner surface 302 may include any shape desirable for removably engaging fill clip 200 to second side 108 of component core 100. As shown in FIGS. 5-6, the shape of inner surface 302 may correspond to the shape of second side 108 of component core 100. In other examples, shown in FIGS. 1-4, the shape of inner surface 302 may be different from the shape of second side 108. As shown in FIGS. 1-6, latch member 300 may include first end 304 and second end 306, opposite first end 304. First end 304 may include first coupling mechanism 308 for coupling first end 304 of latch member 300 to first end 242 of fill member 202. Second end 306 may include second coupling mechanism 310 for coupling second end 244 of latch member 300 to second end 244 of fill member 202. First coupling mechanism 308 and second coupling mechanism 310 may include, for example, a metal clipping mechanism, composite clips, male-female mating, fasteners, and any other coupling mechanism sufficient to couple latch member 300 to fill member 202. As shown FIGS. 3-6, first coupling mechanism 308 and second coupling mechanism 310 may include approximately the same type of coupling mechanism, e.g. pin-pin-socket joint. As shown in FIGS. 1-2, first coupling mechanism 308 may include a different coupling mechanism than second coupling mechanism 310. In another non-limiting example, not shown, first coupling mechanism 308 and/or second coupling mechanism 310 may include a coupling mechanism for permanently coupling one end of latch member 300 to a corresponding end of fill member 202.

FIGS. 1-2 shows an embodiment where first coupling mechanism 308 may include shaft 316 of a hinge joint protruding from first end 304, configured to couple with corresponding shaft receipt opening 254 of fill member 202. Second coupling mechanism 310 may include bar clip 318 of a bar guard joint configured to pivot and couple with corresponding bar 256 of fill member 202. Shaft 316 may be slid into shaft receipt opening 254 of fill member 202, and latch member 300 may be rotated around primary axis $A_{pcc}$ of component core 100. Bar clip 318 of latch member 300 may be pivoted to couple bar 256 of fill member 202 to secure latch member 300 to fill member 202 to removably couple fill clip 200 to component core 100.

In one example, shown in FIGS. 3-6, first coupling mechanism 308 and second coupling mechanism 310 of latch member 300 may each include pin portions 312, 314 of a joint, configured to couple to corresponding pin sockets 250, 252 of fill member 202, respectively. Pin portions 312, 314 may be vertically slid downward into pin sockets 250, 252, respectively, and held in place by stoppers (not shown) at the bottom of pin sockets 250, 252, to cause fill clip 200 to be removably coupled to component core 100.

Although FIGS. 1-6, depict one of each first coupling mechanism 308 and second coupling mechanism 310, it is understood that this number is merely illustrative, and latch member 150 may include additional or fewer coupling mechanisms.

Latch member 300 may be formed, for example, from any material that may be machined and/or processed to form latch member 300. For example, latch member 300 may be formed from ASB, wax pour, and any other material having substantially similar physical properties. In another example, latch member 300 may be formed from the same material as fill member 202.

The examples of FIGS. 1-6 depict fill clip 200 as including fill member 202 and latch member 300 as separable members. As illustrated in the example of FIG. 6, by dotted lines, fill clip 200 may include fill member 202 and latch member 300 as a unitary body.

As shown in the non-limiting examples of FIGS. 1-2, fill clip 200 may also include first moldable member 400 attached to inner surface 204 of fill member 202 for engaging component core 100 by being conformable to the shape of first side 106 of component core 100. First moldable member 400 may include any shape and/or size sufficient to conform to engage first side 106 of component core 100. As shown in FIGS. 1-2, first moldable member 400 may cover the entire inner surface 204 of fill member 202. Although FIGS. 1-2 depict one first moldable member 400 on inner surface 204 fill member 202, it is understood that this number is merely illustrative, and fill clip 200 may include additional first moldable members 400 on inner surface 204 of fill member 202. First moldable member 400 may be formed, for example, from any malleable material that may be machined and/or processed to form first moldable member 400. For example, first moldable member 400 may be formed from, Styrofoam, or any other material having substantially similar physical properties.

As shown in FIGS. 1-2, in another non-limiting example, fill clip 200 may also include second moldable member 402 attached to inner surface 302 of latch member 300 for engaging component core 100 by being conformable to the shape of second side 108 of component core 100. Second moldable member 402 may include any shape and/or size sufficient to conform to engage second side 108 of component core 100. As shown in FIGS. 1-2, second moldable member 402 may cover the entire inner surface 302 of latch member 300. Although FIGS. 1-2 depict one second moldable member 402 on inner surface 302 of latch member 300, it is understood that this number is merely illustrative, and fill clip 200 may include additional second moldable members 402 on inner surface 302 of latch member 300. Second moldable member 402 may be formed, for example, from any malleable material that may be machined and/or processed to form second moldable member 402. For example, second moldable member 402 may be formed from, Styrofoam, or any other material having substantially similar physical properties.

As shown in FIGS. 3-4, fill clip 200 may include first coupling member 500 and second coupling member 502 for coupling latch member 300 to fill member 202. First coupling member 500 may include first end 504 and second end 506, opposite first end 504. First end 504 may include first coupling mechanism 508 for coupling first end 504 of first coupling member 500 to first end 242 of fill member 202. Second end 506 may include second coupling mechanism 510 for coupling second end 506 of first coupling member 500 to first end 304 of latch member 300. First coupling mechanism 508 and second coupling mechanism 510 may include, for example, a metal clipping mechanism, composite clips, male-female mating, or any other coupling mechanism sufficient to couple first end 304 of latch member 300 to first end 242 of fill member 202. As shown in FIGS. 3-4, first coupling mechanism 508 and second coupling mechanism 510 may include pin-pin socket joints. Although FIG. 3 depicts first coupling mechanism 508 and second coupling mechanism 510 as the same coupling mechanism, it is understood that first coupling mechanism 508 and second coupling mechanism 510 may include different coupling mechanisms.

As shown in the example of FIGS. 3-4, second coupling member 502 may include first end 512 and second end 514, opposite first end 512. First end 512 may include first coupling mechanism 516 for coupling first end 512 of second coupling member 502 to second end 244 of fill member 202. Second end 514 may include second coupling mechanism 518 for coupling second end 514 of second coupling member 502 to second end 306 of latch member 300. First coupling mechanism 516 and second coupling mechanism 518 may include, for example, a metal clipping mechanism, composite clips, male-female mating, and any other coupling mechanism sufficient to couple second end 306 of latch member 300 to second end 244 of fill member 202. As shown in FIG. 3, first coupling mechanism 516 and second coupling mechanism 518 may include pin-pin socket joints. Although FIGS. 3-4 depicts first coupling mechanism 516 and second coupling mechanism 518 as the same or similar coupling mechanisms, it is understood that first coupling mechanism 516 and second coupling mechanism 518 may include different coupling mechanisms.

As shown in the example of FIGS. 3-4, the coupling mechanisms of first coupling member 500 and second coupling member 502 may include similar types of coupling mechanisms. Alternatively, the coupling mechanisms of first coupling member and second coupling member 502 may include any combination of various coupling mechanisms. Although not shown, first coupling member 500 and/or second coupling member 502 may include a moldable member similar to first moldable member 400 and second moldable member 402 as described herein. Although FIGS. 3-4 depicts one each first coupling member 500 and second coupling member 502, it is understood that this number is merely illustrative, and fill clip 200 may include more or less coupling members. First coupling member 500 and second coupling member 502 may be formed, for example, from any material that may be machined and/or processed to form coupling members sufficient to couple latch member 300 to fill member 202. For example, first coupling member 500 and second coupling member 502 may be formed from ASB, wax pour, or any other material having substantially similar physical properties. First coupling member 500 may be formed, for example, from the same or similar material as second coupling member 502. In another example, first coupling member 500 and second coupling member 502 may be formed from the same or similar material as fill member 202 and/or latch member 300 and/or first moldable member 400 and/or second moldable member 402.

FIG. 7 shows a perspective view of a non-limiting example of fill reservoir 700 for collecting and/or redistributed excess slurry into component core 100 while injecting slurry into internal portions 110, 112, 114 using fill clip 200, as will be discussed herein. Fill reservoir 700 may include cavity 702 within reservoir 700 for collecting and storing excess slurry form internal portions 110, 112, 114 of component core 100. As shown in the non-limiting example of FIG. 7, cavity 702 may be open to the surroundings at a top end of reservoir 700. Although the non-limiting example of FIG. 7 depicts one cavity 700, it is understood that this number is merely illustrative, and fill reservoir 700 may include more or less cavities 702. For example, fill reservoir 700 may include a number of cavities (not shown) corresponding to the number of internal portions 110, 112, 114.

As shown in FIG. 7, fill reservoir 700 may also include slurry outputs 704, 706, 708 in fluid communication with cavity 702. Slurry outputs 704, 706, 708 may be configured to fluidly connect with slurry overflow openings 122, 124, 126 of component core 100. Slurry outputs 704, 706, 708 may receive the excess slurry (not shown) released from component core 100 at the overflow openings and deposit the excess slurry in cavity 702. Slurry outputs 704, 706, 708 may also redistribute the excess slurry stored in cavity 702 back into internal portions 110, 112, 114, for example to fill voids in internal portions 110, 112, 114 upon vibration of the component core 100. Slurry outputs 704, 706, 708 may include any desirable structure for receiving and/or redistributing slurry (not shown). As shown in FIG. 7, slurry outputs 704, 706, 708 may include a circular female opening in fill reservoir 700 corresponding to slurry overflow openings 122, 124, 126 of component core 100, positioned to receive excess slurry (not shown) from internal portions 110, 112, 114 of component core 100. In another example, slurry outputs 704, 706, 708 may include tubing (not shown) to connect slurry outputs 704, 706, 708 with slurry overflow openings 122, 124, 126 of component core 100. Slurry outputs 704, 706, 708 may be positioned at any location of fill reservoir 700 sufficient to receive and/or redistribute excess slurry from at least one internal portion 110, 112, 114 of component core 100. For example, as shown in FIG. 7, slurry outputs 704, 706, 708 may be positioned on bottom side 710 of fill reservoir 700.

Although FIG. 7 depicts three slurry outputs 704, 706, 708, it is understood that this number is merely illustrative, and fill reservoir 700 may include more or less slurry outputs.

In another non-limiting example, not shown, fill reservoir 700 may also include a latch (not shown) for securing fill reservoir 700 to component core 100. In one non-limiting example, the latch may include a clip.

Fill reservoir 700 may be positioned at any location on component core 100 sufficient to collect and/or redistribute slurry into internal portions 110, 112, 124. For example, as shown in FIG. 7, fill reservoir 700 may be positioned at top side 109 of component core 100. As shown in FIG. 7, fill reservoir 700 may take advantage of gravitational forces to redistribute slurry into internal portions 110, 112, 114. In another non-limiting examples, not shown, fill reservoir 700 may include other mechanisms for redistributing slurry into internal portions 110, 112, 114, for example, air pressure. Although FIG. 7 depicts one fill reservoir 700, it is understood that this number is merely illustrative, and multiple fill reservoirs may be used to collect and/or redistribute excess slurry. In another non-limiting example, a number of fill reservoirs, corresponding to the number of slurry overflow openings 122, 124, 126 may be used. Fill reservoir 700 may be formed, for example, from any material that may be machined and/or processed to form a fill reservoir sufficient for collecting and redistributing slurry into internal portions 110, 112, 114. For example, fill reservoir 700 may be formed from ASB, wax pour, and any other material having substantially similar physical properties. In another example, fill reservoir 700 may be formed from the same or similar material as fill member 202 and/or latch member 300.

According to various embodiments, fill clip 200 and/or fill reservoir 700 may be used in a method for injecting slurry into an internal portion of a component core. In some embodiments, this method includes sub-processes such as:

Process P1: Provide an injection mold component core 100 including internal portions 110, 112, 114, a fill clip 200, a fill reservoir 700, and a slurry source (not shown).

Process P2: Attach fill member 202 of fill clip 200 to component core 100 by positioning fill member 202 so that slurry outputs 208, 210, 212 engage slurry receipt openings 116, 118, 120 of component core 100.

Process P3: Position latch member 300 around component core 100 and couple latch member 300 to fill member 202 to secure fill member 202 to component core 100.

Process P4: Position fill reservoir 700 on top side 109 of component core 100 so that slurry outputs 704, 706, 708 of fill reservoir 700 engage slurry overflow openings 122, 124, 126 of component core 100.

Process P5: Fill internal portions 110, 112, 114 of component core 100 with slurry.

In various embodiments, the method may include additional steps. In various embodiments, the method may include use of alternative examples of fill clip 200, fill reservoir 700 and/or component core 100. In other various embodiments additional components may be used, for example, first and/or second moldable members 400, 402 may be used.

Fill clip 200 and fill reservoir 700 (FIGS. 1-7) may be formed in a number of ways. In one embodiment, fill clip 200 and/or fill reservoir 700 may be formed by welding, casting, forging or other conventional metal-working approaches. In one embodiment, however, additive manufacturing is particularly suited for manufacturing fill clip 200 and/or fill reservoir 700 (FIGS. 1-7). As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 8:
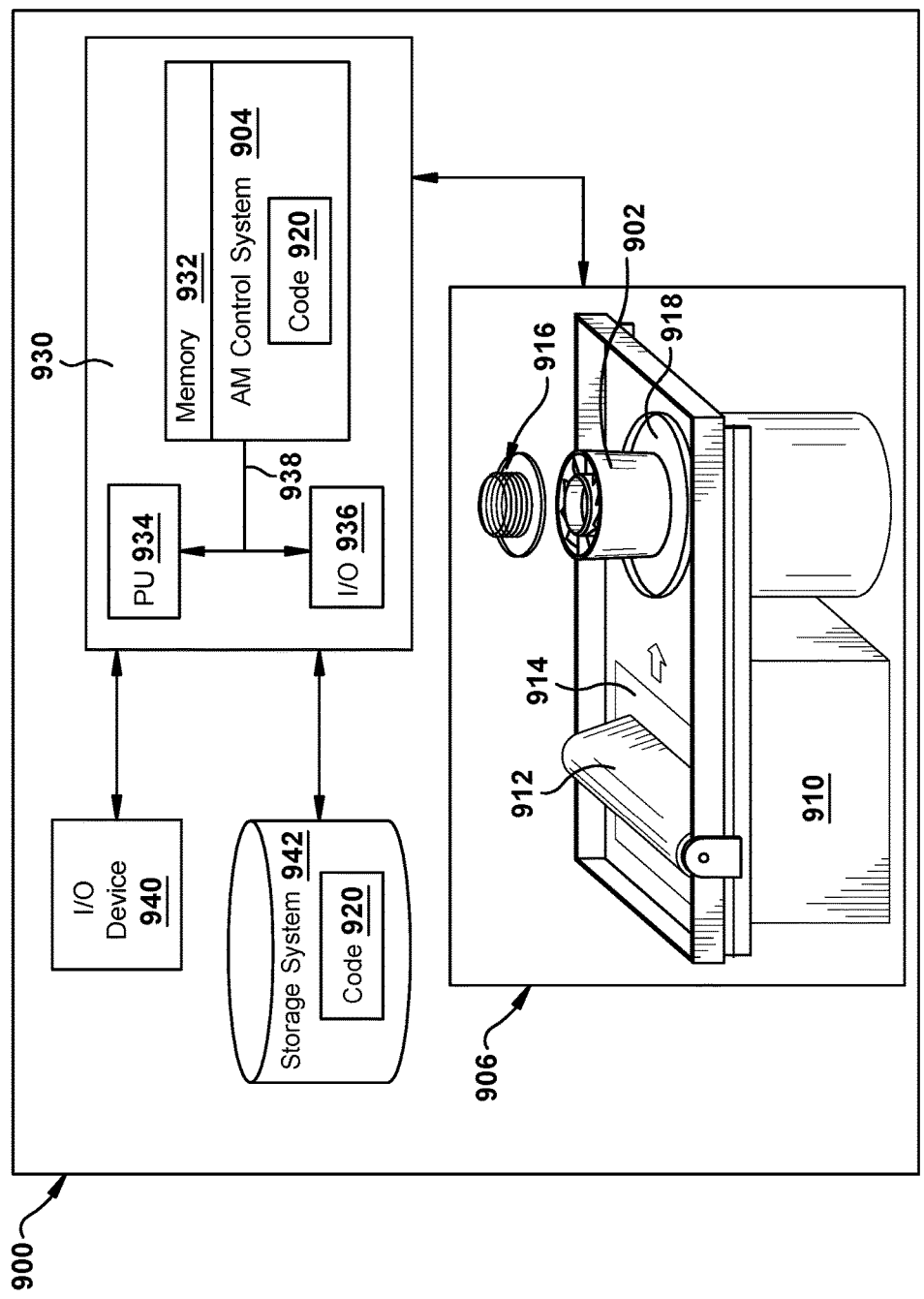
FIG. 8 shows a diagram illustrating an AM system for manufacturing a fill clip and fill reservoir according to various embodiments of the disclosure.

To illustrate an example of an additive manufacturing process, FIG. 8 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture fill clip 200 and/or fill reservoir 700 (FIGS. 1-7). AM system 900 generally includes a computerized additive manufacturing (AM) control system 904 and an AM printer 906. AM system 900, as will be described, executes code 920 that includes a set of computer-executable instructions defining fill clip 200 and/or fill reservoir 600 (FIGS. 1-7) to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, fill clip 200 and/or fill reservoir 700 (FIGS. 1-7) may be made of plastic/polymers or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of fill clip 200 and/or fill reservoir 700 (FIGS. 1-7), described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of fill clip 200 and/or fill reservoir 700 (FIGS. 1-7). As noted, code 920 includes a set of computer-executable instructions defining outer electrode that can be used to physically generate the object(s) 902, upon execution of the code by system 900. For example, code 920 may include a precisely defined 3D model of outer electrode and can be generated from any of a large variety of well-known computer aided design (CAD) software systems such as Auto-CAD®, TurboCAD®, Design CAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, an operator or owner of system 900, or from other sources. In any event, AM control system 904 executes code 920, dividing fill clip 200 and/or fill reservoir 700 (FIGS. 1-7) into a series of thin slices that it assembles using AM printer 906 in successive layers of liquid, powder, sheet or other material. In the DMLM example, each layer is melted to the exact geometry defined by code 920 and fused to the preceding layer. Subsequently, the object 902 may be exposed to any variety of finishing processes, e.g., minor machining, sealing, polishing, assembly to other part of the igniter tip, etc.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A fill clip for injecting slurry into an internal portion of an injection mold component core, the fill clip comprising:
   a fill member sized to engage a first side of the injection mold component core, the fill member having at least one slurry input for receiving the slurry and a plurality of slurry outputs positioned to output the slurry into the internal portion of the injection mold component core; and
   a latch member coupled with the fill member, the latch member configured to removably couple the fill member with the injection mold component core.

2. The fill clip of claim 1, wherein the latch member includes a metal clipping mechanism.

3. The fill clip of claim 1, further comprising a first moldable member coupled to an inner surface of the fill member, the moldable member configured to conform to the first side of the injection mold component core.

4. The fill clip of claim 3, further comprising a second moldable member coupled to the inner surface of the latch member, the second moldable member configured to conform to a second side of the injection mold component core, the second side opposing the first side.

5. The fill clip of claim 1, wherein fill member includes an inner surface having a shape that corresponds to a shape of the first side of the injection mold component core.

6. The fill clip of claim 1, wherein the latch member is sized to engage a second side of the injection mold component core, the second side opposing the first side of the injection mold component core.

7. The fill clip of claim 1, wherein the latch member includes an inner surface having a shape that corresponds to a shape of a second side of the injection mold component core, the second side opposing the first side of the injection mold component core.

8. The fill clip of claim 1, wherein the at least one slurry input consists of a single slurry input.

9. The fill clip of claim 1, wherein the fill member includes a set of fluid passages spanning between the at least one slurry input and the plurality of slurry outputs, wherein the set of fluid passages are isolated from each other.

10. The fill clip of claim 1, further comprising a hinge coupling the latch member and the fill member.

11. The fill clip of claim 1, wherein a number of slurry outputs in the fill member corresponds to a number of slurry receipt openings on the first side of the injection mold component core, the slurry receipt openings in fluid communication with the internal portion of the injection mold component core.

12. The fill clip of claim 11, wherein each slurry output includes a male component configured to engage a corresponding one of the slurry receipt openings, each of the slurry receipt openings including a female component.

13. The fill clip of claim 1, wherein the fill member includes a cavity spanning between the at least one slurry input and the plurality of slurry outputs, the cavity sized to store slurry.

14. The fill clip of claim 1, wherein the fill member and the latch member are configured to surround a primary axis of the injection mold component core when the fill member is engaged to the first side of the injection mold component core and the latch member is coupled to the fill member.

15. The fill clip of claim 1, wherein the latch member includes acrylonitrile butadiene styrene plastic.

16. The fill clip of claim 1, wherein the latch member and the fill member are substantially unitary.

17. The fill clip of claim 1, further comprising at least one coupling member for coupling the latch member and the fill member.

18. The fill clip of claim 1, wherein the fill member is sized to engage the first side of the injection mold component core at a lower surface of the first side of the injection mold component core.

19. An injection mold system for injecting slurry into a component core, the core having a first end, a second end and an internal portion between the first end and the second end, the injection mold system comprising:
   a fill clip for injecting slurry into the internal portion of the component core, the fill clip including:
      a fill member sized to engage a first side of the component core, the fill member having at least one slurry input for receiving the slurry and a plurality of slurry outputs positioned to output the slurry into the internal portion of the component core; and
      a latch member coupled with the fill member, the latch member configured to removably couple the fill member with the component core; and a fill reservoir configured to couple with at least one of the first end or second end of the component core, the fill reservoir for collecting excess slurry into the internal portion of the component core during an injection mold process, the fill reservoir configured to engage a top surface of the component core, the fill reservoir including:

a cavity for collecting the excess slurry; and at least one slurry output positioned to output the excess slurry back into the internal portion of the component core.

20. A method of manufacturing a fill clip for injecting slurry into an internal portion of a component core, the method comprising:

providing a non-transitory computer readable storage medium storing code representative of the fill clip, the code configured to physically generate at least:

a fill member sized to engage a first side of the injection mold component core, the fill member having at least one slurry input for receiving the slurry and a plurality of slurry outputs positioned to output the slurry into the internal portion of the injection mold component core; and a latch member coupled with the fill member, the latch member configured to removably couple the fill member with the injection mold component core; and physically generating the fill clip by processing the code by a computerized additive manufacturing system.

* * * * *